June 14, 1932.  R. MOONEY  1,863,496

VEHICLE WHEEL BOLT

Filed April 29, 1931  2 Sheets-Sheet 1

INVENTOR.

Richard Mooney

BY Lancaster, Allwine & Rommel

ATTORNEYS.

June 14, 1932.  R. MOONEY  1,863,496
VEHICLE WHEEL BOLT
Filed April 29, 1931  2 Sheets-Sheet 2

INVENTOR.
Richard Mooney
BY Lancaster, Allwine and Rommel
ATTORNEYS.

Patented June 14, 1932

1,863,496

UNITED STATES PATENT OFFICE

RICHARD MOONEY, OF HENRYETTA, OKLAHOMA

VEHICLE WHEEL BOLT

Application filed April 29, 1931. Serial No. 533,813.

The present invention relates to demountable wheels for motor vehicles and the like and the primary object of the invention is to provide improved means to facilitate quick and easy changing of demountable wheels.

A further object of the invention is to provide an improved mounting arrangement for demountable wheels whereby the wheels may be changed from the axle spindle to a spare carrier rack and vice versa without requiring removal and replacing of clamping nuts.

A further object of the invention is to provide an improved arrangement whereby the coupling bolts are non-detachably carried by the hub shell of the wheel and will therefore not become lost as is liable to occur with the usual form of coupling nuts which must be entirely removed for mounting of the wheel.

A further object of the invention is to provide an improved arrangement which may be applied to existing types of vehicle wheels and one requiring a minimum number of coupling bolts for proper mounting of the wheel upon the axle spindle.

A still further object of the invention is to provide a coupling bolt of improved construction wherein the threaded end of the bolt proper is in a substantially protected position so as to prevent injury to the threads during handling of the wheel.

Other objects and advantages of the invention will be apparent during the course of the following detailed description, taken in connection with the accompanying drawings forming a part of this specification and in which drawings.

Figure 1:
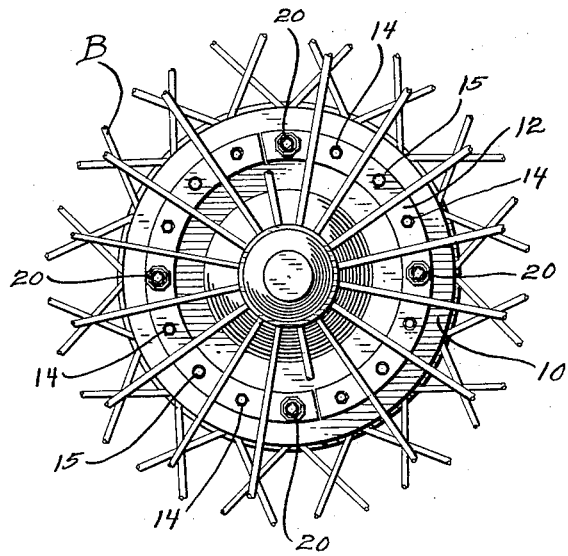
Figure 1 is a plan view looking at the outer side of a wheel hub provided with the improved securing means.
Figure 2:
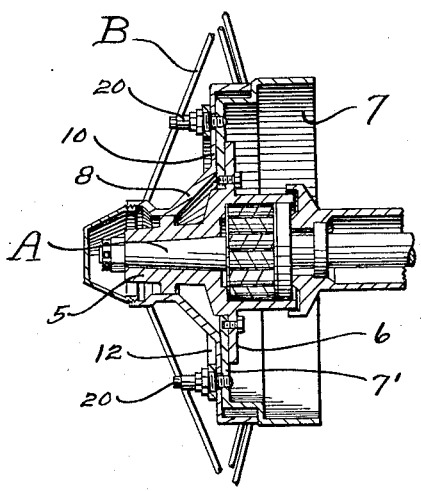
Figure 2 is a section showing the manner of mounting the wheel upon an axle spindle.
Figure 3:
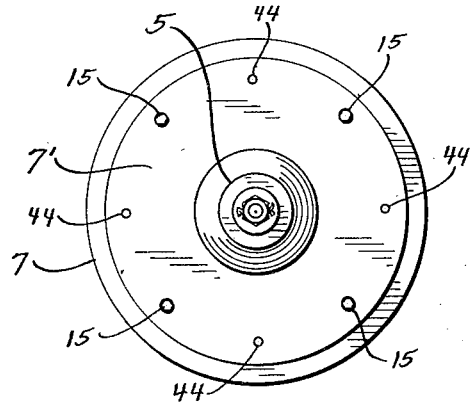
Figure 3 is a plan view looking at the outer end of the axle spindle with the wheel removed.
Figure 4:
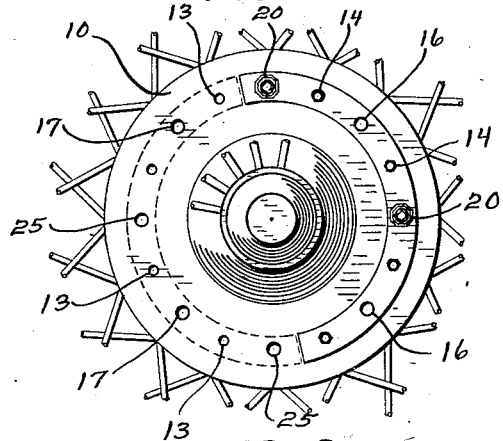
Figure 4 is a partially assembled view showing the arrangement of openings in the wheel hub for receiving the various retaining bolts.

The letter A designates an axle spindle upon which is mounted a hub 5 having the usual hub flange 6 to which the brake drum 7 is bolted or otherwise secured. The letter B designates a conventional type of spoked wheel provided with the hub shell 8. The manner of mounting the brake drum upon the hub flange varies in different types of wheel mountings and for the purpose of explanation the attaching portion 7' of the brake drum 7 will be referred to as a mounting flange of the hub 5. The hub shell 8 is provided with the disc portion 10 which in the mounting of the wheel engages upon the mounting flange 7'.

Figure 5:
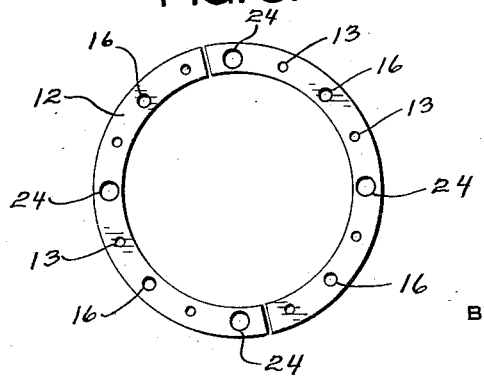
Figure 5 is a plan view of the two part clamping ring.

The improved coupling or securing means for removably securing the wheel B upon the axle A embodies a clamping ring 12 which may be divided into two semi-circular shaped sections as shown in Figures 1 and 5 to permit assembling of the ring between the inner and outer spokes of a wheel about the bell portion of the hub shell 8 in contact with the outer side of the disc portion 10. In new work, the ring 12 may be continuous and applied to the hub shell prior to assembling of the spokes. The ring 12 is provided with a series of equi-distantly spaced apart apertures 13 for receiving attaching bolts or the like 14 whereby the ring sections are secured in annular formation to the hub shell disc portion 10.

Figure 6:
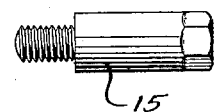
Figure 6 is an enlarged plan view of one of the centering or aligning studs.

The mounting flange 7' is provided with a series of threaded openings arranged concentric to the axis of the flange for receiving four stud bolts 15 as shown in detail in Figure 6. The clamping ring 12 is provided with circular openings 16 which align with correspondingly shaped openings 17 provided in the disc portion 10 and these aligning openings 16 and 17 receive the studs 15 when the hub shell is positioned over the mounting flange 7'. Thus the studs 15 aside from serving as centering or aligning studs for the hub shell, also serve to prevent circumferential movement of the hub shell with respect to the mounting flange 7'.

Figure 7:
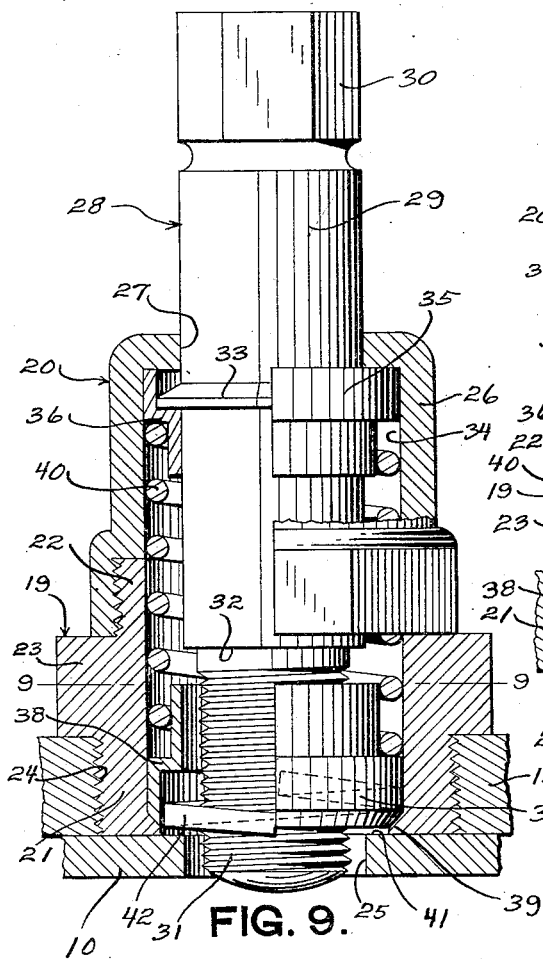
Figure 7 is an enlarged view part in section and part in elevation of one of the securing devices shown in a retracted position.
Figure 8:
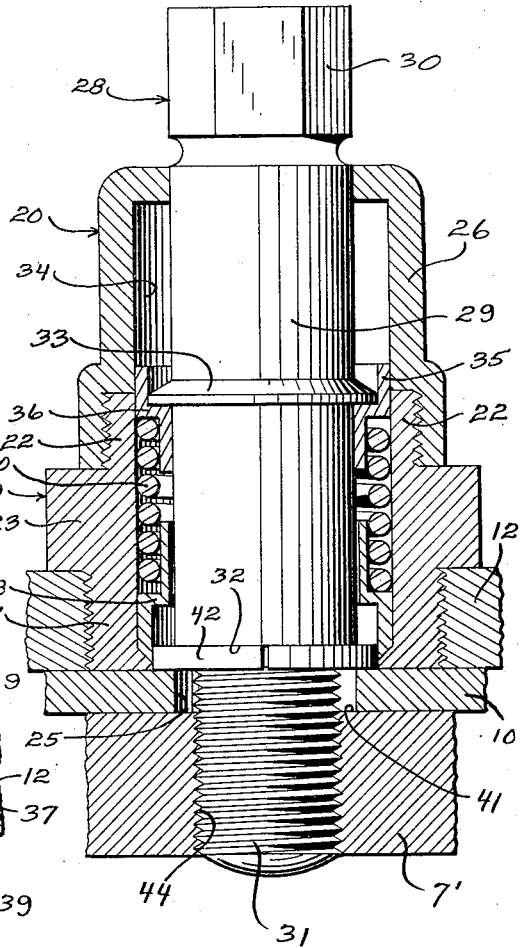
Figure 8 is a section thru one of the securing devices showing the same in threaded engagement with a portion of the brake drum for mounting the wheel.
Figure 9:
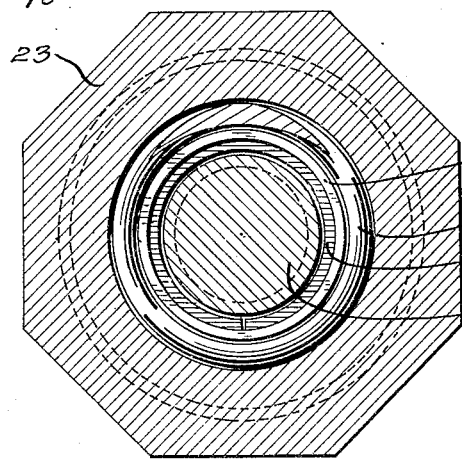
Figure 9 is a section on the line 9—9 of Figure 7.

Carried by the ring 12 is a series of four mounting or coupling devices 20 for securing the wheel to the mounting flange 7' and which are shown in detail in Figures 7 and 8.

Each of the devices 20 comprises a coupling member having inner and outer externally threaded end portions 21 and 22 respectively and an intermediate wrench square portion 23 providing shoulders for the threaded portions 21 and 22. The clamping ring 12 is provided with four equi-distantly spaced apart threaded apertures 24 for threaded reception of the devices 20. These threaded apertures 24 receive the threaded ends 21 of the coupling members and axially align the coupling devices with plain apertures 25 provided in the disc portion 10. Threaded upon the outer end portion 22 of the coupling member 19 is a hollow cap 26 provided in its end wall with a circular opening 27 arranged axially with the opening thru the coupling member.

The coupling member 19 and cap 26 form a combined housing and guide for a coupling bolt 28 including a cylindrical shank portion 29 provided at its outer end with a wrench square 30 and at its inner end with a reduced threaded portion 31 providing an annular shoulder 32. Formed on the cylindrical shank portion 29 at a point substantially midway the ends thereof is an annular flange 33 which acts as a stop flange to limit outward sliding movement of the coupling bolt thru the opening 27.

Slidably guided in the outer end of the cylindrical chamber 34 formed by the coupling member 19 and cap 26 and encircling the bolt shank 29 inwardly of the annular shoulder 33 is a stepped guide ring 35 providing a shoulder or seat 36 for engagement with the flange 33. Fitting in the inner end of the chamber 34 is a stepped guide ring 37 providing an annular shoulder or seat 38. Provided at the inner end of the chamber 34 is an internal annular shoulder 39 which acts as a retaining shoulder for the ring 35. Encircling the bolt shank 29 between the rings 35 and 37 is an expansion coil spring 40 which acts to normally project the wrench square 30 outwardly thru the opening 27 and draw the inner threaded end 31 of the bolt into the chamber 34 as shown in Figure 7. As will be observed in Figures 7 and 8, the inner end of the cylindrical chamber 34 is of greater diameter than the plain opening 25 thru the disc portion 10 and provides an annular shoulder 41 which confronts the inner side of the ring shoulder 38 and provides an annular pocket for receiving a split lock washer 42. This lock washer 42 encircles the threaded shank portion 31 and is intended to be clamped upon the shoulder 41 by the bolt shoulder 32 when the coupling bolts are connected with the mounting flange 7'.

The mounting flange 7' is provided with threaded openings 44 into which the threaded ends 31 of the coupling bolts 38 are threaded for securing the wheel to the mounting flange. These threaded openings 44 are so arranged in the mounting flange 7' as to align with the openings 25 in the disc portion 10 when the centering or aligning studs 15 are extended thru the openings 16 and 17 provided in the clamping ring 12 and disc portion 10 respectively.

In mounting the wheel B upon the axle A, the hub shell 8 is placed over the hub 5 and rotated until the aligning openings 16 and 17 align with the studs 15 and allow the disc portion 10 to be moved into contact with the mounting flange 7'. In this position the studs 15 will prevent relative rotation of the disc portion 10 and mounting flange 7' and align the coupling bolts 28 with the threaded openings 44. During handling of the wheel, the coupling bolts 28 are in a retracted position as shown in Figure 7. The coupling bolts 28 may then be moved inwardly against the tension of the coil springs 40 so that the threaded end portion may engage in the aligning threaded opening 44 and after which a wrench may be placed upon the head 30 and the bolts rotated for threading into the openings 44. The bolts are turned until the shoulder 32 firmly clamps the washer 25 against the annular shoulder 41 and which draws the disc portion 10 into binding contact with the mounting flange 7'. When the bolts 28 are rotated and withdrawn from the openings 44 by the springs 40 the bolts are held in a coupled relation to the hub shell 8 by the caps 26.

Thus it will be seen that an improved form of coupling device for demountable wheels has been provided wherein a minimum number of coupling bolts will be required and one wherein the coupling bolts are slidably and rotatably retained in position upon the hub shell of the wheel for ready and quick threaded engagement with the mounting flange of the hub.

Changes in detail may be made to the form of invention herein shown and described, without departing from the spirit of the invention or the scope of the following claims.

I claim:

1. A coupling device for demountable wheels comprising a housing having a hollow coupling member for connection with the hub shell of the wheel and a cap carried by the outer end of the coupling member and having an axial guide opening thru its outer end wall, a coupling bolt rotatably guided in the housing and projecting thru said guide opening and having a threaded inner end, and an annular flange spaced from an end of the bolt; a guide ring encircling the bolt at the inner side of the flange and a coil spring encircling the coupling bolt and acting against the guide ring to normally urge the bolt outwardly thru the guide opening.

2. A coupling device for demountable wheels comprising a housing providing a cylindrical chamber open at the inner end of the housing and communicating with a guide opening at the outer end of the housing, a coupling bolt extending thru the guide opening and having a threaded inner end, an annular flange formed intermediate the ends of the bolt for limiting outward movement thereof, a guide ring encircling the bolt at the inner side of the flange, a second guide ring mounted at the inner end of the cylindrical chamber, and a coil spring acting between the guide rings for normally urging the bolt outwardly in the housing.

3. A coupling device for demountable wheels comprising a housing providing a cylindrical chamber being open at its inner end and having an axial guide opening at its outer end, a coupling bolt in the housing and extending thru the guide opening, said bolt having a threaded inner end, an annular stop flange provided intermediate the ends of the bolt for limiting movement thereof, a guide ring encircling the bolt at the inner side of the flange, an annular retaining shoulder provided at the inner end of the cylindrical chamber, a second guide ring seating upon the retaining shoulder, and an expansion coil spring acting between the guide rings for normally urging the coupling bolt outwardly.

4. A coupling device for demountable wheels comprising a housing including a hollow coupling member having screw threaded inner and outer ends, a cap threaded upon the outer end of the coupling member and having an axial guide opening in its outer end wall, a coupling bolt rotatable and axially movable in the guide opening and having a threaded inner end, an annular flange encircling the intermediate portion of the coupling bolt, a stepped guide ring encircling the bolt at the inner side of the flange, a second guide ring mounted against movement at the inner end of the coupling member, and an expansion coil spring acting between the guide rings for normally urging the coupling bolt outwardly.

5. A coupling device for demountable wheels comprising a housing including a hollow coupling member for connection with the hub shell of the wheel and a cap carried by the outer end of the coupling member and having an axial guide opening provided in its outer end wall, said coupling member and cap providing a cylindrical chamber open at the inner end of the housing, a coupling bolt rotatable and axially movable in the housing and projecting thru said guide opening, said bolt having a reduced screw threaded inner end, an annular stop flange about the intermediate portion of the bolt, a stepped guide ring encircling the bolt at the inner side of the stop flange and providing an annular seat engaging the flange, a stepped ring at the inner end of the cylindrical chamber providing an annular seat, and an expansion coil spring acting between the seats of the rings for normally urging the coupling bolt outwardly.

6. A coupling device for demountable wheels comprising a housing having a hollow coupling member, for connection with the hub shell of the wheel, said member having an internal annular shoulder, a cap carried by the outer end of the coupling member, having an axial guide opening thru its outer end wall, a guide ring, having an annular pocket, seated against said shoulder; a lock washer within the pocket; a rotatable coupling bolt axially guided in the housing and having a lock washer engaging shoulder and a reduced threaded end extending from said last mentioned shoulder, and encircled by said lock washer; and means urging said guide ring against said first mentioned shoulder.

RICHARD MOONEY.